United States Patent [19]

Breaux

[11] Patent Number: 4,840,589
[45] Date of Patent: Jun. 20, 1989

[54] UNDERWATER EXHAUST SYSTEM FOR BOATS OF STEPPED-HULL CONSTRUCTION AND INCLUDING EXHAUST COOLING

[76] Inventor: Vance V. Breaux, P.O. Box 146, Loreauville, La. 70552

[21] Appl. No.: 220,366

[22] Filed: Jul. 11, 1988

Related U.S. Application Data

[63] Continuation of Ser. No. 907,189, Sep. 12, 1986, abandoned.

[51] Int. Cl.[4] ............................................. B63B 1/34
[52] U.S. Cl. ........................................ 440/89; 60/310
[58] Field of Search ............... 440/88, 89; 60/309, 60/310, 317, 320, 321, 281; 181/198, 220, 221, 235, 259, 260

[56] References Cited

U.S. PATENT DOCUMENTS

| | | | |
|---|---|---|---|
| 3,198,162 | 8/1965 | Larsen | 440/89 |
| 3,296,997 | 1/1967 | Hoiby | 440/89 |
| 4,002,136 | 1/1977 | Michalak | 440/89 |
| 4,393,802 | 7/1983 | Rizzo | 114/67 A |
| 4,744,778 | 5/1988 | Porter | 440/89 |
| 4,786,265 | 11/1988 | Porter | 440/89 |

FOREIGN PATENT DOCUMENTS

| | | | |
|---|---|---|---|
| 1305292 | 1/1973 | United Kingdom | 440/89 |
| 2065036 | 6/1981 | United Kingdom | 440/89 |

*Primary Examiner*—Joseph F. Peters, Jr.
*Assistant Examiner*—Clifford T. Bartz
*Attorney, Agent, or Firm*—Mason, Fenwick & Lawrence

[57] ABSTRACT

An underwater exhaust system which acts to increase the speed of a boat, to reduce fuel consumption, to improve handling and to reduce the skin friction of the water in high seas. The exhaust system basically comprises an exhaust box built into the hull over the bottom of the boat and a diffuser positioned between the exhaust box and the boat bottom. The engine exhaust is directed through the exhaust box and out the exhaust holes of the diffuser into the water. A pump is used to pump seawater into the exhaust box for cooling of the exhaust. Also, there is a step in the hull. The step is positioned approximately 25% from the transom of the stern. The combination of the step and the directing of the exhaust under the hull enhances the speed of the boat and its handling.

18 Claims, 7 Drawing Sheets

UNDERWATER EXHAUST SYSTEM FOR BOATS OF STEPPED-HULL CONSTRUCTION AND INCLUDING EXHAUST COOLING

This application is a continuation of application Ser. No. 907,189, filed Sept. 12, 1986, now abandoned.

FIELD OF THE INVENTION

The present invention generally relates to underwater exhaust systems for nautical vessels, and more specifically to an underwater exhaust system which includes an exhaust box built into the hull of a boat and a diffuser position between the exhaust box and the boat bottom. Exhaust gas from an engine passes through the exhaust box where it is cooled by circulating water and then out through exhaust ports provided in the diffuser. Exhaust gas escaping from the diffuser is passed aftward along the bottom of the hull, which has a stepped construction near the diffuser.

BACKGROUND OF THE INVENTION

In the design and construction of nautical vessels, such as crew boats and work boats for both the offshore drilling industry and the fishing industry, it is always an objective to deliver a boat exhibiting increase speed, efficiency, reduced fuel consumption, improved overall handling, and reduced skin friction of the water, especially in high seas. Several attempts have been made in the prior art to deal with one or more of these parameters. However, the prior art has not been able produce an exhaust system that accomplishes all of the objectives at the same time.

The prior art systems have generally utilized underwater exhaust of engine gas as a means of muffling the sound of a running engine. In fact, the prior art contains several examples of methods which have been suggested to reduce the sound of an engine and simultaneously attempt to increase the efficiency of the vessel. In some cases, the exhaust gases from the propulsion system have been directed into the propeller area in the aft section of the vessel However, this method has not met with great success because vessel efficiency is destroyed by cavitation which takes place at the propeller area as exhaust gas passes by the propeller.

The energy which is produced by a rotating propeller as it drives a vessel in the forward direction, must be uniform in nature in order for the vessel to properly navigate the open seas. When gases are introduced into the flow system of the propeller, irregular forces adversely effect the propeller action, causing a dramatic decrease in vessel performance and operating efficiency.

As a means of propelling a boat, the prior art has used a jet propulsion system where jets of fluid such as water or gas are expelled under the aft hull section of a boat in order to drive the vessel in a forward direction. Jet propulsion systems, which are generally inefficient in propelling a boat, should not be confused with the utilization of exhaust gas from an engine that is used to rotate a propeller in order to move the boat. In jet propulsion systems, fluid is expelled under the hull with great force: whereas in exhaust gas systems, exhaust gas is expelled at a moderate rate as it is produced by the engine that powers the boat.

U.S. Pat. Nos. 4,393,802 (Rizzo) and 4,002,136 (Michalak) are examples of prior art exhaust systems which are employed to facilitate forward motion of a vessel. The Rizzo patent relates to a system which uses a longitudinal channel and a step to define a recessed void into which exhaust gas is introduced. Thus, the Rizzo system employs an actual cavity in the hull below the vessel as part of its propulsion system. The Michalak patent teaches a system for placing the exhaust in the stern of a vessel. The placement of the exhaust system muffles noises produced by the ship's engines. However, because the system is located so far back near the stern section of the ship, only a small section of the bottom of the hull of the boat is available. Thus it is impossible to create any increase in lift or reduction in skin friction along the hull of the vessel.

There is thus a need for an underwater exhaust system which acts to increase the speed of a boat, reduce fuel consumption, improve handling, and reduce skin friction of water. The present invention is directed toward filling that need by providing an exhaust system that uses an exhaust box built into the hull of the vessel over the bottom of the boat and a diffuser position between the exhaust box and the boat bottom. Exhaust gas from an engine passes through the exhaust box where it is cooled by circulating water and then out through exhaust ports provided in the diffuser. Exhaust gas escaping from the diffuser is passed along the bottom of the hull, which has a stepped construction near the diffuser.

SUMMARY OF THE INVENTION

Concisely stated, the present invention relates to an underwater exhaust system which acts to increase the speed of a boat, to reduce fuel consumption, and to improve handling, and to reduce the skin friction of the water in high seas. The exhaust system basically comprises an exhaust box built into the hull over the bottom of the boat and a diffuser position between the exhaust box and the boat bottom. The engine exhaust in the form of a gas is directed through an exhaust pipe and into the exhaust box into exhaust ports provided in the diffuser, and from the diffuser into the water. A pump is used to pump seawater into the exhaust box for cooling of the exhaust and for cooling the exhaust box. Also, there is an inwardly directed, aftward step in the hull that is positioned at a line on the hull that is approximately 25% of the boat's length as measured from the stern. The combination of the step and the directing of the exhaust gas under the hull enhances the speed of the boat, its handling, and its overall efficiency.

In a preferred embodiment, there are four engines used to power the boat. Each engine drives a propeller shaft which in turn, rotates a propeller. Likewise, each engine delivers its exhaust to a dedicated exhaust box. Each exhaust box is hollow and includes flat vertically oriented front and aft plates. These plates are arranged parallel to each other and spaced a sufficient distance to define a the interior of the exhaust box. The two vertically oriented plates are held in position in part by being welded to a flat generally square shaped aluminum member and a flat generally rectangular aluminum member. The port and starboard sides of the exhaust box are each constructed from two planar aluminum sheets. The first sheet comprises a vertically oriented planar plate member which is shaped like a rectangular. The starboard side portion is completed by a planar rectangular shaped plate which is tilted at an inward angle.

Welded within the aft end of the exhaust box is an angled splash plate. The splash plate contains several weep holes that communicate with further weep holes defined within the hull structure. These weep holes provide a way to prevent build up of unwanted gases within the exhaust box. The bottom of the exhaust box contains a diffuser plate that incorporates a series of exhaust outlets. In a preferred embodiment, there are six exhaust outlets each 2½ inches in diameter and arranged one next to the other transverse across the width of the exhaust box. In another embodiment, eight 2½ are staggered The bottom of the hull of the boat terminates in a stepped construction wherein a starboard vertical plate extends tranversely across the entire starboard bottom of the hull from the keel at the centerline outward to the starboard chine. A port vertical plate is positioned the same way on the port bottom. The two vertical plates define a transverse step with the bottom of the hull aft of the step being positioned inward relative to the bottom of the hull forward of the step. The recessed bottom of the hull very gradually and smoothly slopes aftward so that at some point, the hull is in the shape it would normally be in without the stepped construction. In a preferred embodiment, the transverse step is placed forward of the transom by a distance approximately equal to 25% of the length of the boat as measured from the transom to stem. The transverse step is interrupted by each of the diffuser and angled plates associated with each of the exhaust boxes.

In a preferred embodiment a seawater inlet enters the exhaust pipe The seawater inlet is connected to a water pump which in turn is connected to a flow meter alarm that puts out an audible tone and/or lights a warning lamp to indicate when the flow of sea water through the pipe falls below a certain predetermined level. The other side of the flow meter is connected to a sea chest. The use of a separate sea chest for each exhaust box may be replaced by a common sea chest shared by two adjacent exhaust boxes. In an alternative arrangement for the water inlet system, water is introduced into the top forward side of the exhaust box without the need for a pump. Disposed about the exhaust box is an aluminum water jacket. The exhaust box within the water jacket contains several spaced apertures disposed about the periphery of the exhaust box. When water is introduced into the water jacket, the apertures define a ring spray through which the exhaust gas passes as the gas emerges from the end of the exhaust pipe.

In use, as the vessel moves under the propulsion of the propellers which in turn are rotated by shafts driven by the engines, exhaust gas from each engine passes through its associated exhaust pipe and into an exhaust box where the exhaust gas co-mingles with water being pumped into the exhaust box either directly or through the exhaust pipe. The water entering the exhaust box is used to cool the exhaust gas as well as the exhaust box. In a preferred embodiment, water is pumped into the box at the rate of about 20 gallons per minute.

The exhaust gas travels under the bottom of the hull as the gas emerges through the exhaust outlets of the diffuser. The exhaust outlets are positioned just aft of the step defined in the hull. Exhausting of the gas through the outlet holes taken in conjunction with the step in the hull lead to enhanced speed and operation of the vessel.

It is a primary object of the present invention to provide an improved underwater exhaust system for use in a boat It is another object of the present invention to provide a novel exhaust box for use in an underwater exhaust system.

It is still an object of the present invention reduce skin friction of water passing along the hull of a boat.

Other objects and advantages of the present invention will become apparent hereinafter and in the drawings.

DETAILED DESCRIPTION OF THE PREFERRED EMBODIMENTS

Figure 1:
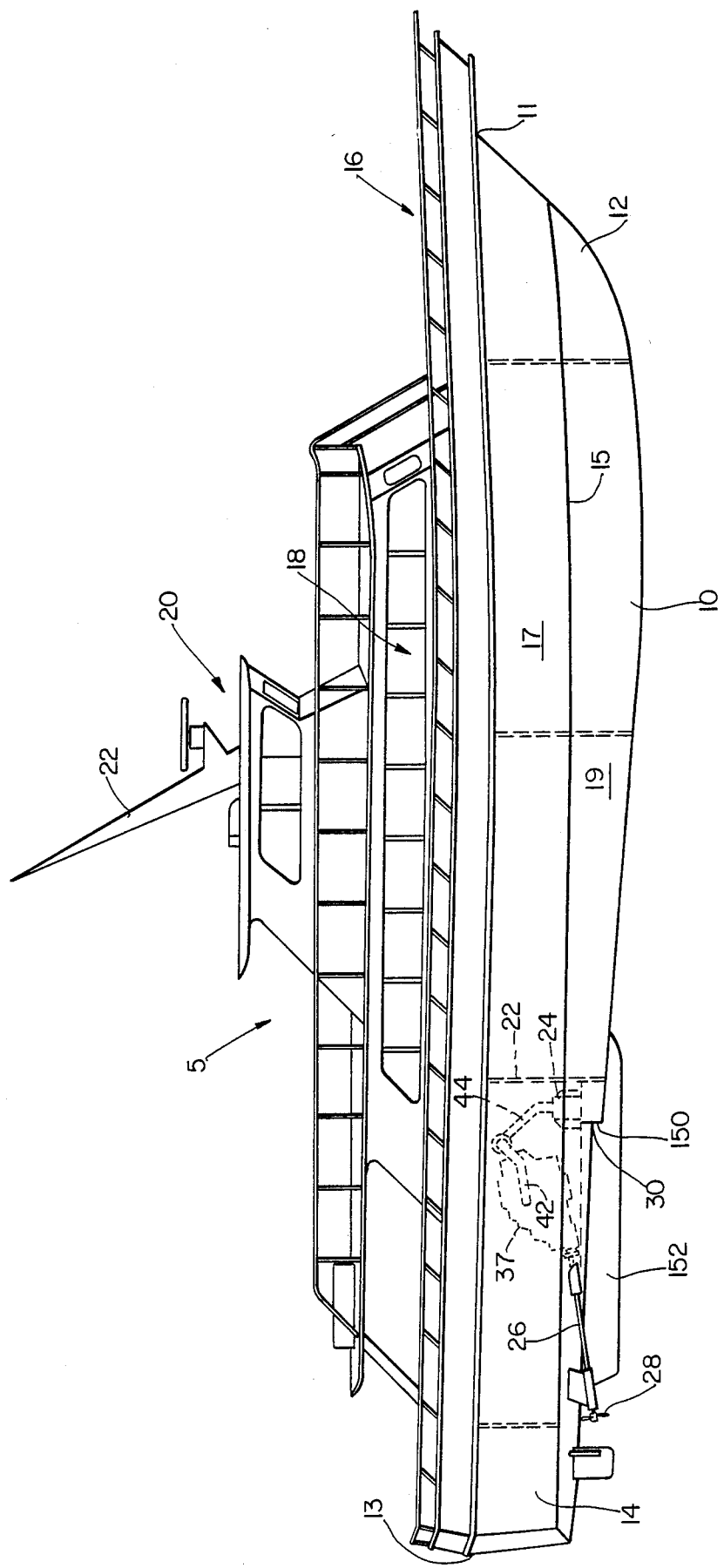
FIG. 1 is a starboard view of a fishing boat incorporating the teachings of the present invention

In describing preferred embodiment of the invention illustrated in the drawings, specific terminology will be resorted to for the sake of clarity, however, the invention is not intended to be limited to the specific terms so selected and it is to be understood that each specific term includes all technical equivalents which operate in a similar manner to accomplish a similar purpose.

As shown in FIG. 1, one embodiment of the present invention is defined within the hull 10 of a fishing boat 5 that measures approximately 80 feet from the bow end 11 to the transom 13. In FIG. 1, which shows the starboard outline of the vessel, the boat basically consists of an elongated hull 10 which terminates at its forward end in a stem portion 12 and at its aft end in a stern portion 14. The ship contains a fore deck 16 aft of which is positioned the main cabin 18. This cabin occupies the major deck area of the ship. Atop the main cabin is a fly bridge 20. Emanating from the top of the fly bridge is a mast head 22. In a preferred embodiment, the ship is constructed in accordance with known construction techniques for building aluminum V-bottom boats. Line 15 is the chine which marks the intersection between the substantially vertical starboard side 17 and the starboard bottom 19 of the hull 10. A similar chine marks the intersection between the port side 23 and the port bottom 21 of the hull. The ship contains several vertically oriented frames and bulkheads. For simplicity, only the bulkheads are shown in phantom in FIG. 1, with the understanding that there are 4 equally spaced frames between each pair of adjacent bulkheads. Of particular interest is bulkhead 22. In the ship made according to the teachings of the present invention, there are 22 frames including 5 bulkheads. Bulkhead 22 is positioned so that there are 15 frames (including 2 bulkheads) forward of bulkhead 22 and six frames (including one bulkhead) aft of bulkhead 22.

Figure 2:
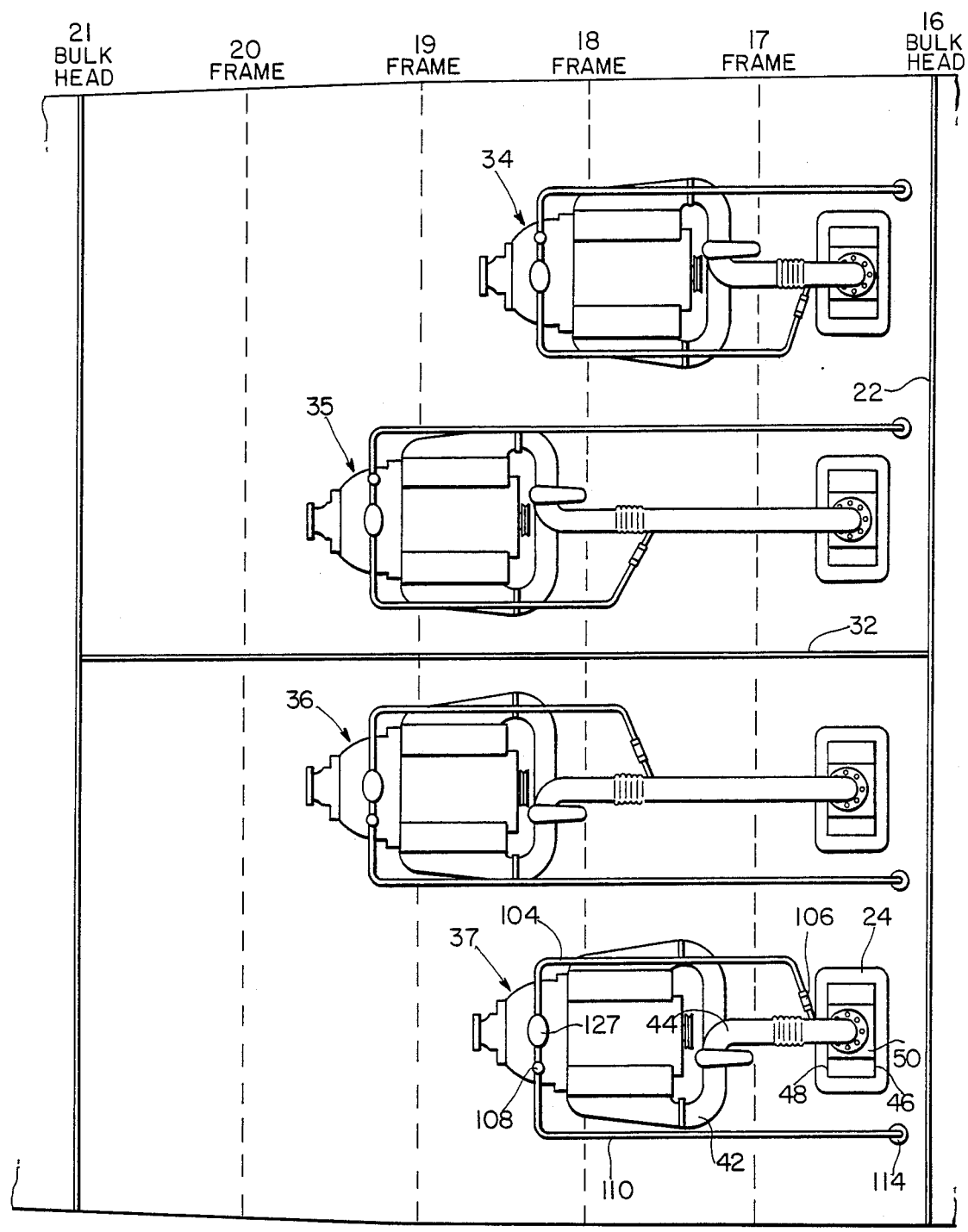
FIG. 2 is a top perspective plan view of the interior of the bottom hull showing the placement of the four engines used to drive the vessel and the association of each engine with an exhaust box and sea chest.

In a preferred embodiment shown in FIG. 2, there are four engines 34-37 used to power the boat. Each engine is associated with a propeller shaft that terminates in a propeller. For purposes of generally explaining the subject invention, the most starboard engine 37 and exhaust box 24 are shown in phantom in FIG. 1. Engine 37 drives propeller shaft 26 to rotate propeller 28. Engine 37 has its manifold 42 connected to an exhaust pipe 44 that terminates at the top of exhaust box 24. As shown in FIG. 2, a pump 127 is positioned on the top aft section of motor 37. This pump takes in sea water through a circular sea chest 114 and injects the water into the exhaust box 24 in order to cool the exhaust gas before it is passed through a diffuser 30 and out the bottom of the hull 10. The water also cools the aluminum exhaust box 24.

FIG. 2 schematically shows a top view of the interior of the hull 10 aft of bulkhead 22. The interior of the hull is divided in half by longitudinal center line 32. On either side of the center line are a pair of port engines 34-35 and a pair of starboard engines 36-37. Transverse frames 16 through 22 are schematically shown by dotted lines on FIG. 2. Bulkhead 22 occupies the space denoted as Frame 16, whereas bulkhead 21 occupies the space denoted as frame 21. The positioning and mounting of the engines are in accordance with prior art conventional designs. The two inboard engines 35 and 36 are positioned aft of the two outboard engines 34 and 37 by a distance substantially equal to the distance between adjacent frames 18 and 19. In addition, each of the engines is of conventional design. One engine found acceptable for practicing the present invention is a diesel engine developing 380 horse power and manufactured by General Motors under the designation 8V-71TI.

Figure 9:
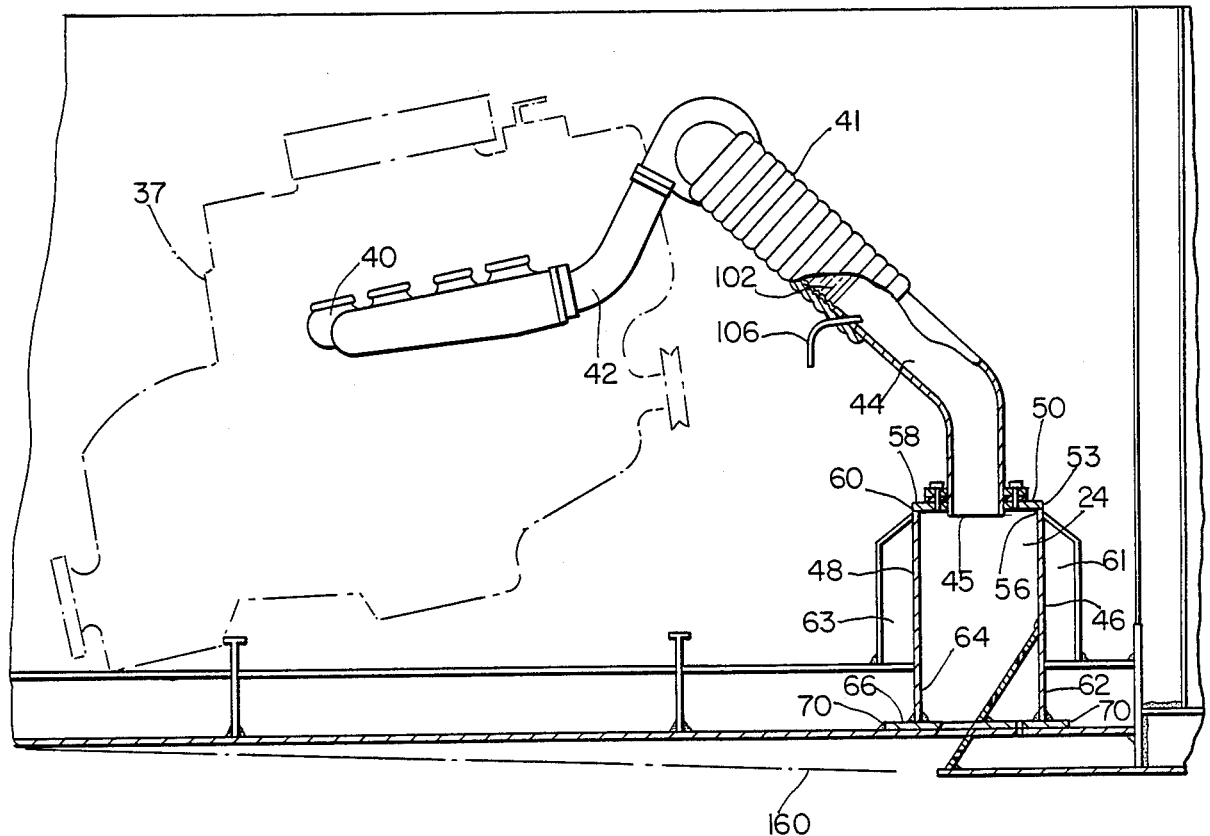
FIG. 9 is a schematic view showing the connection between an internal combustion engine used to power the boat and the exhaust box with the exhaust box partially cut away.

In describing the exhaust system of the present invention, reference is made to starboard engine 37 and its associated structure including exhaust box 24. It is to be understood that remaining engines 34 through 36 contain similar structures that differ only in size and shape, but not function. For this reason, anything said about engine 37 and its associated structure likewise applies to engines 34-36 and their associated structure. With reference to engine 37 as shown in FIGS. 1 and 9, the engine contains several exhaust ports 40 to pass exhaust gas into exhaust manifold 42 and then through elongated tubular exhaust pipe 44. The end 45 of the exhaust pipe passes into the top of hollow exhaust box 24.

As shown in FIG. 3—5 and 9, the exhaust box 24 is generally hollow and includes a flat vertically oriented front plate 46 and a flat vertically oriented aft plate 48. These plates are arranged parallel to each other and spaced a sufficient distance to define the interior of the exhaust box. The plates are also oriented with their planes transverse to the centerline 32 of the boat The two vertically oriented plates are held in position in part by being welded to a flat generally square shaped aluminum member 50 and a flat generally rectangular aluminum member 52. Member 50 is oriented perpendicular to the vertical plates and has a forward edge 52 joined with the top edge 56 of plate 46 by welding. At the same time plate 50 has its rear edge 58 joined to the top edge 60 of vertical plate 48 by welding. Welds are also used to secure the bottom edges 62 and 64 of vertical plates 46 and 48, respectively to the top surface 66 of bottom horizontal plate 52. This plate in turn is secured to the ship structure 68 through a series of welds 70. Fore and aft T-bars 61 and 63 are oriented vertically and welded to the exterior central portion of plates 46 and 48 to add further support to the exhaust box structure.

Figure 3:
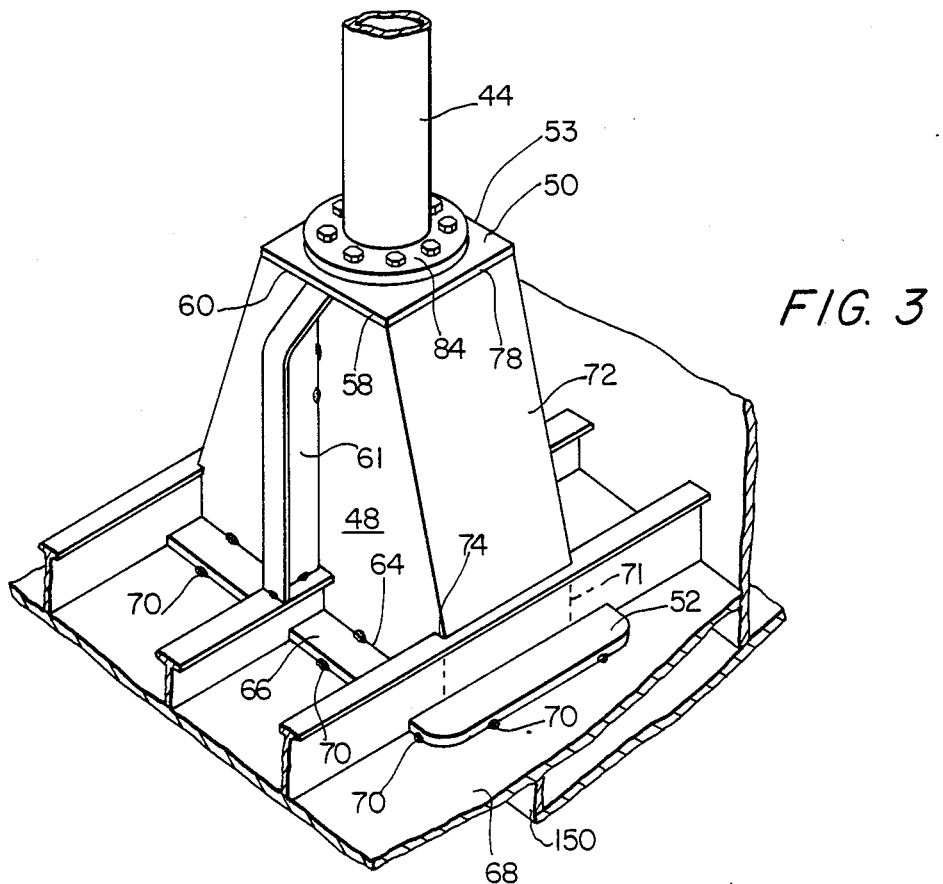
FIG. 3 is an aft and starboard view in perspective of an exhaust box showing a portion of the hull and a portion of the exhaust pipe.
Figure 5:
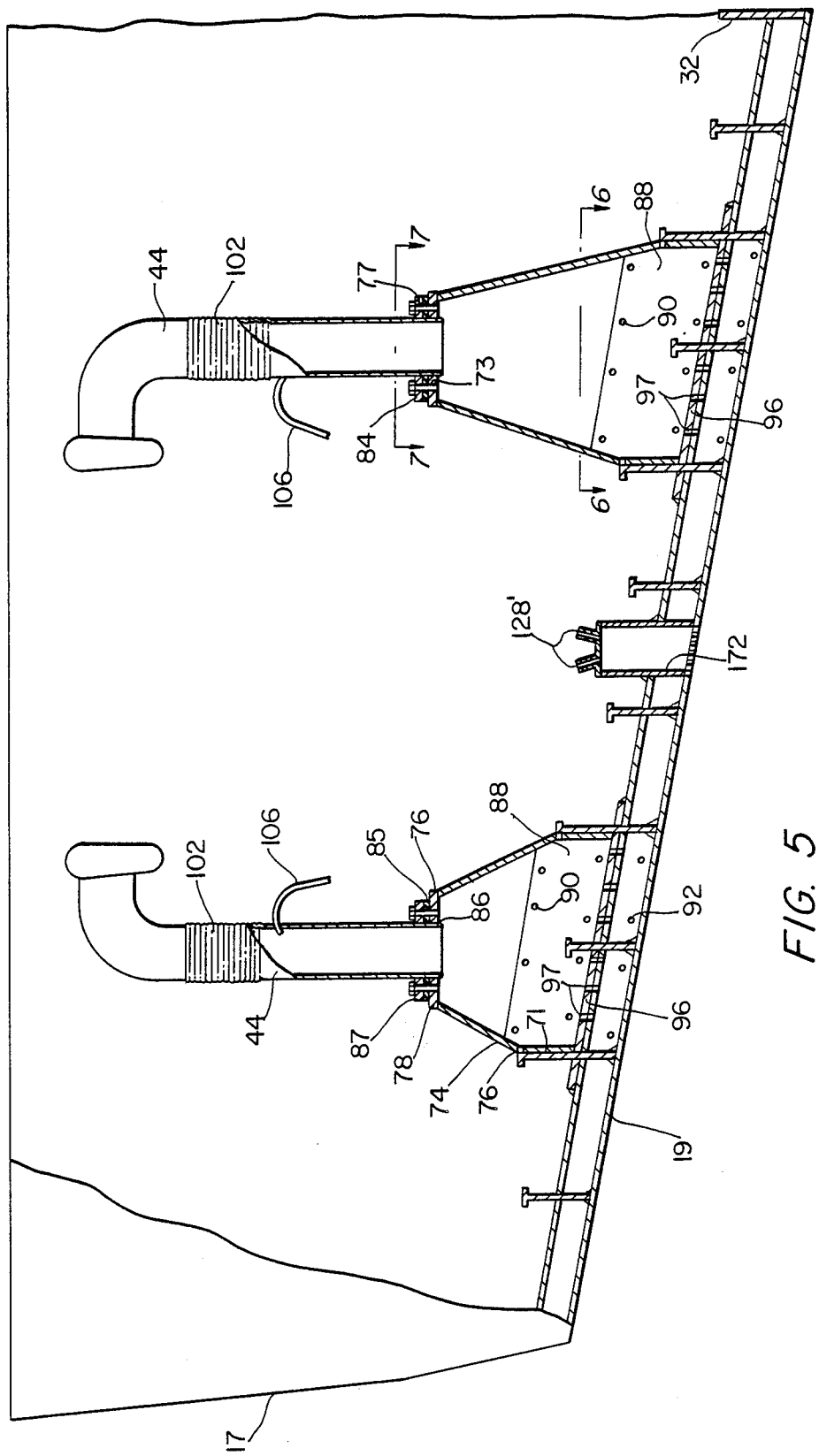
FIG. 5 is a schematic view of the starboard side of the hull just forward of bulkhead 16 showing the placement of the two starboard exhaust boxes, with the exhaust boxes being partially cut away. Also shown is an alternative arrangement illustrating a shared sea chest.
Figure 6:
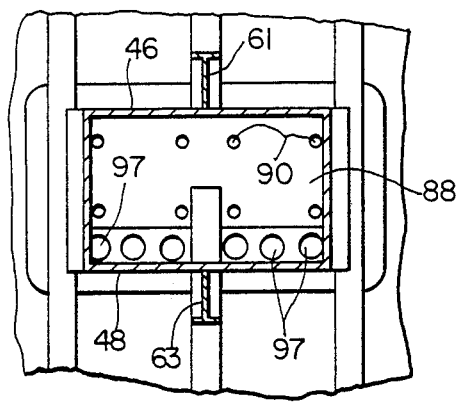
FIG. 6 is a view taken along lines 6—6 of FIG. 5.
Figure 7:
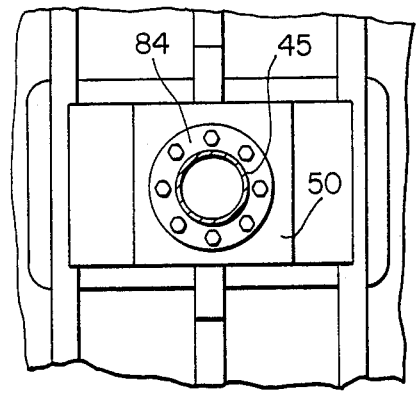
FIG. 7 is a view taken along lines 7—7 of FIG. 5.

The port and starboard sides of the exhaust box 24 are each constructed from two planar sheets. As shown in FIG. 3 and 5 and with reference to the exhaust box 24 associated with engine 37, the first plate comprises vertically oriented planar plate member 71 which is shaped like a rectangular. The starboard side portion is completed by planar rectangular shaped plate member 72 which has its lower edge 74 mated with the top edge 76 of member 71 and held together by a weld. Plate 72 is tilted at an inward angle so that its top edge 76 mates with starboard edge 78 of plate 50.

The plate 50 at the top of the exhaust box 24 contains an aperture 86 of appropriate diameter to receive the five inch diameter exhaust pipe 44. In a preferred embodiment, the plate 50 is made up of a one inch thick aluminum flange. Disposed within the flange are several threaded holes 73. Where the holes are placed in the flange is determined by the position of complementary holes 77 found on a stainless steel flange 84 which is welded to the end portion of exhaust pipe 44 by weld 87. Thus, the end of the exhaust 44 is held within the exhaust box 24 by the flange 84 being fixedly secured to the top of plate 50 with a gasket 85 positioned therebetween. The aperture in plate 50 is arranged so that the longitudinal axis of pipe 44 is oriented vertically and is substantially concentric with the vertical longitudinal axis of the exhaust box 24.

Welded within the aft end of the exhaust box is an angled splash plate 88. The splash plate contains several weep holes 90. The weep holes 90 communicate with further weep holes 92 and 94 defined within the hull structure. These weep holes provide a way to prevent build up of unwanted gases within the exhaust box.

Figure 11:
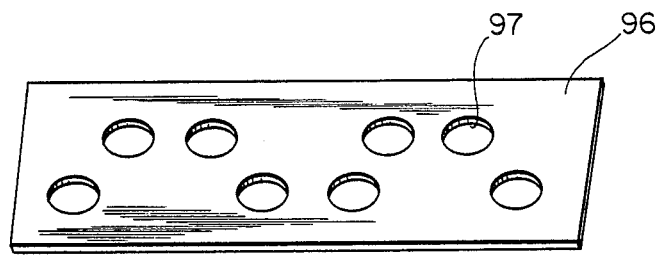
FIG. 11 is a perspective view of a diffuser plate showing an alternative exhaust outlet arrangement.
Figure 12:
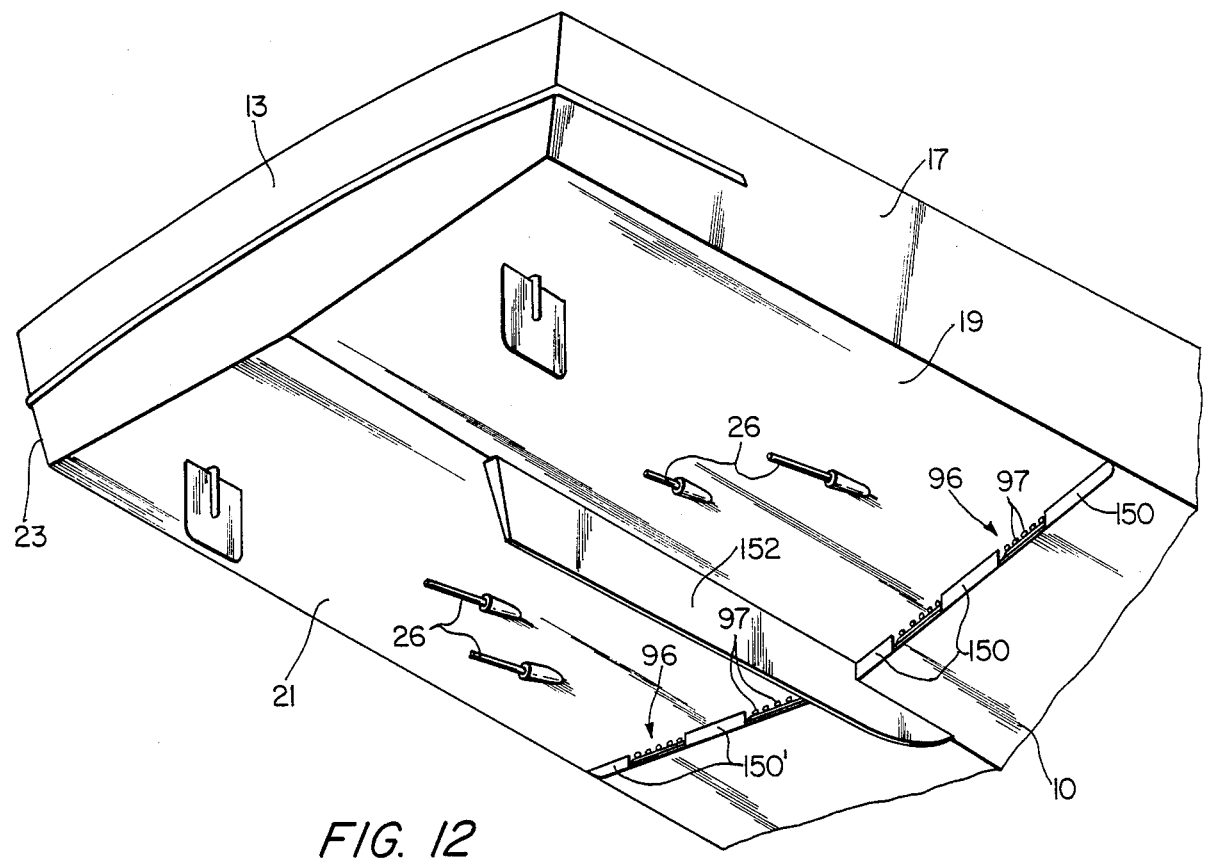
FIG. 12 is a bottom perspective view of the aft section of the boat in FIG. 1 with the propellers removed.

The bottom of the exhaust box contains a diffuser plate 96 that contains a series of exhaust outlets 98. In a preferred embodiment, there are six exhaust outlets 97 each 2½ inches in diameter and arranged one next to the other transverse across the width of the exhaust box. The exhaust outlets are positioned aft of an imaginary transverse plane that divides the exhaust box 24 in half. FIG. 11 shows an alternative arrangement consisting of eight staggered outlets. The size and number of outlets is determined by the amount of exhaust gas developed by a given engine.

Figure 4:
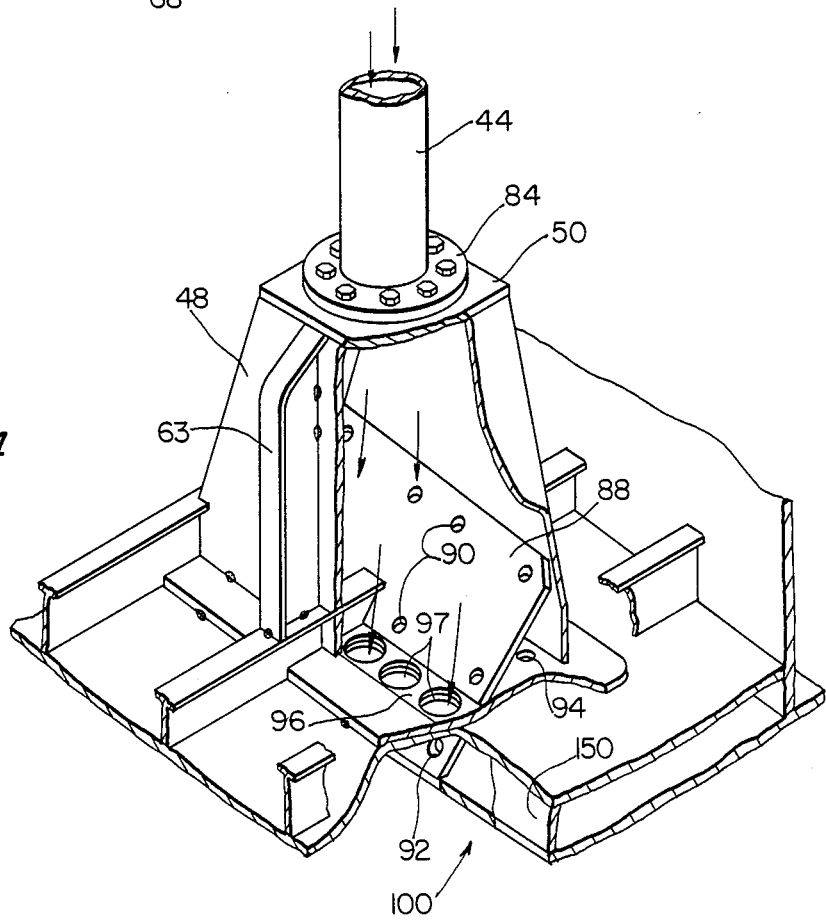
FIG. 4 is the same view as FIG. 3 partially cut away to reveal the interior of the exhaust box.

The bottom of the hull of the ship terminates in a stepped construction 100 that can best be seen in FIGS. 1, 4 and 9. As shown in FIGS. 1, 4 and 9, a starboard vertical plate 150 extends tranversely across the entire starboard bottom 19 of hull 10 from the keel 152 at the centerline 32 outward to the starboard chine 15. A port vertical plate 150' is positioned the same way on the port bottom 21. The two vertical plates define a transverse step with the bottom of the hull aft of the step being positioned inward relative to the bottom of the hull forward of the step. As shown by the imaginary line 160 in FIG. 9, the depressed bottom of the hull very gradually and smoothly slopes aftward so that at about frame 20 the hull is in the shape it would normally be in without the stepped construction. In a preferred embodiment, the transverse step is placed forward of the transom by a distance approximately equal to 25% of the length of the boat as measured from the transom to stem, with a range of from 20% to 30% being preferred.

As shown in FIG. 4, the transverse step 150 is interrupted by each of the diffuser and angled plates associated with each of the exhaust boxes.

Figure 8:
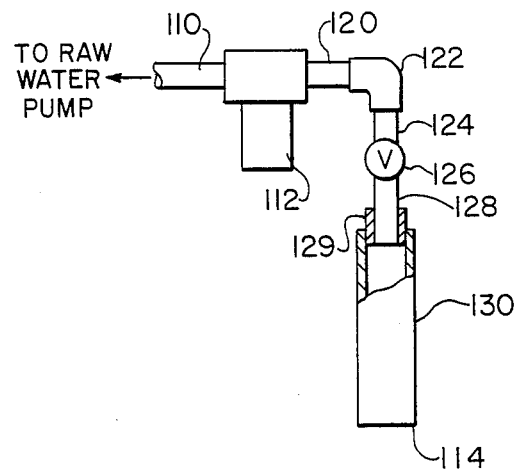
FIG. 8 is a schematic view showing the connection of the water line from the pump to the sea chest.

The exhaust pipe 44 emanating from the plate 50 includes a stainless steel flexible portion 102 which facilitates securing each end of the exhaust pipe to the manifold of the engine and to the exhaust inlet of the exhaust box 24. The rigid sections of the exhaust pipe, in a preferred embodiment, are made of 5 inch schedule 40 stainless steel pipe. Likewise, in a preferred embodiment a seawater inlet 106 enters the exhaust pipe 44 just downstream of the flexible section 102. The seawater inlet 106 is connected though a pipe 104 to the output of a water pump 26 positioned on the motor 37. The input of the water pump 127 is connected to a flow meter alarm 108 of conventional design. The alarm puts out an audible tone and/or lights a warning lamp to indicate when the flow of sea water through the pipe 104 falls below a certain predetermined level. The other side of the flow meter is connected to a pipe 110 that passes through a water strainer and eventually to a sea chest 114. With reference to FIG. 8, the connection of the pipe 110 to the water strainer and to the sea chest is shown in greater detail.

As shown in FIG. 8, pipe 110 is secured to the output of the water strainer 112. The input of the water strainer passes through a stainless steel nipple 120 that is secured to a stainless steel elbow 122. A stainless steel nipple 124 joins the elbow 122 to a gate valve. Finally, the stainless steel nipple 128 joins an aluminum collar 129 made of schedule 80 aluminum to a cylindrically shaped aluminum pipe 130 also made of schedule 80 aluminum. The bottom of the pipe 130 is flush with the bottom of the hull of the boat and defines the sea chest through which water is drawn under pumping action into the seawater inlet of the exhaust pipe 44. The sea chest, which is welded to the bottom of the hull, defines a 4 inch diameter circular opening for entry of seawater.

With reference to FIG. 5, the use of a separate sea chest for each exhaust box is replaced by a common sea chest 172 shared by two adjacent exhaust boxes. The sea chest 172 is made the same way as sea chest 130 with the single stainless steel nipple of sea chest 130 replaced by two stainless steel nipples 128'. Each of the stainless steel nipples 128' are connected to its own gate valve and water strainer and raw water pump as described before.

Figure 10:
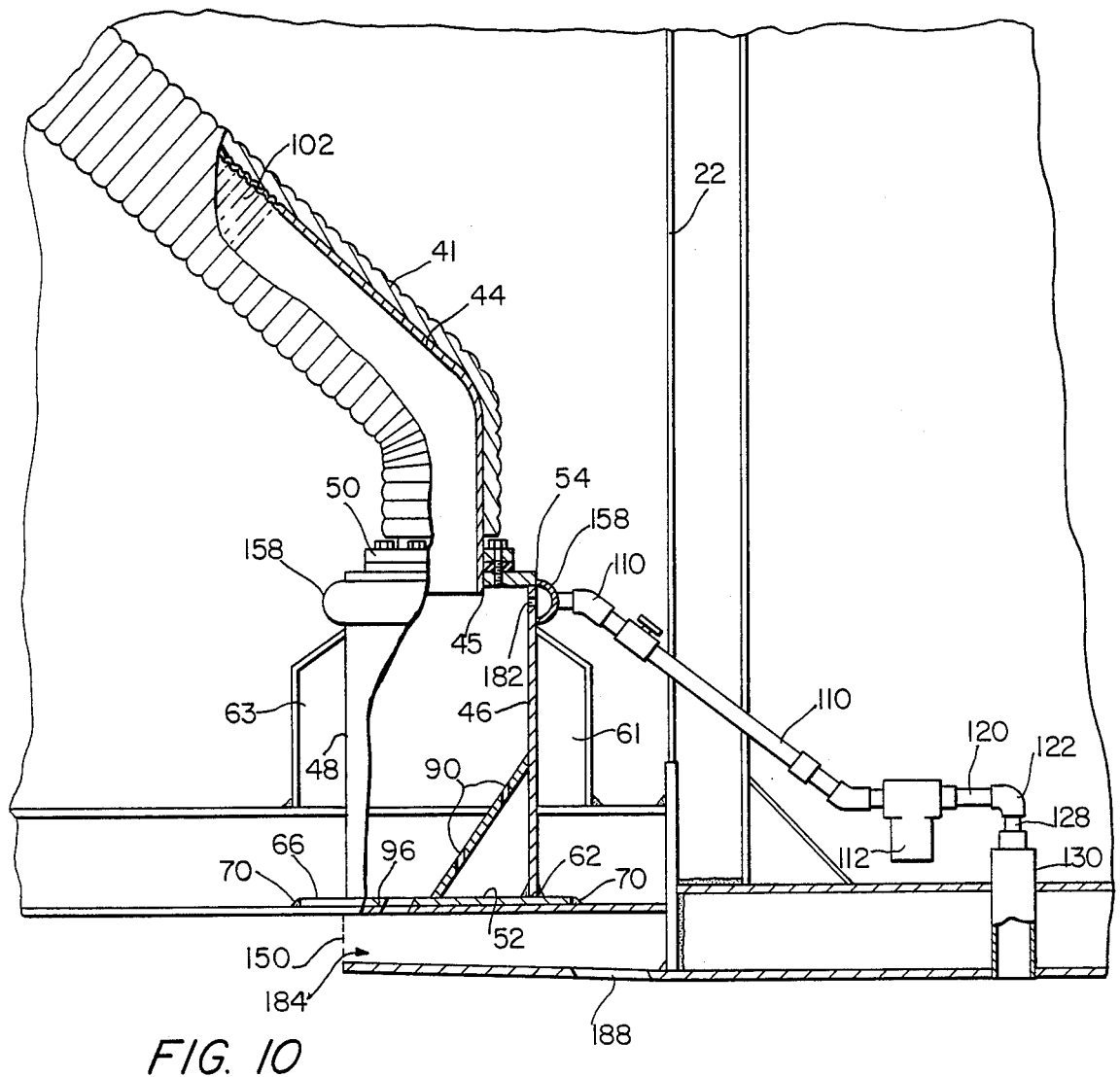
FIG. 10 is a view similar to that of FIG. 9 showing an alternative arrangement for the exhaust box and an alternative arrangement for the introduction of water into the exhaust box to mix with the stream of exhaust gas passing through the box.

FIG. 10 shows an alternative arrangement for the water inlet system where the water is introduced into the to forward side of the exhaust box 24 without the need for a pump. Disposed about the exhaust box 24 is an aluminum water jacket 150 within which is introduced the water from the pipe 110. The jacket 158 surrounds the exhaust box, so that the jacket resembles a squared off torroid. The exhaust box within the water jacket contains several spaced apertures 182 disposed about the periphery of the exhaust box. When water is introduced into the water jacket, the apertures 182 define a ring spray through which the exhaust gas passes as the gas emerges from the end of the exhaust pipe 44. The forward motion of the boat, causes water to enter the sea chest and pass into the exhaust box without the need of a pump. With reference to FIGS. 9 and 10, a conventional head wrap 41 is placed around the exhaust pipe 41 to occupy the space between the sea water inlet and where the exhaust pipe connects to the manifold 42 of engine 37.

Again referring to the embodiment of FIG. 10, the bottom of the hull includes an elongated slit opening 188 which acts as a water scoop to introduce water into the exhaust chest for cooling purposes when the boat is moving in an aftward direction. The slit has a length approximately equal to the length of the diffuser plate 96. Also, the bottom of the hull extends aft so that a space 184 is created between the hull bottom and the diffuser plate. The step 150 (noted in dotted line on FIG. 10) is present on either side of the exhaust box 24 in the same way as previously described hereinbefore.

In use, as the vessel moves under the propulsion of the propellers 28 which in turn are rotated by shafts 26 driven by the engines 34—37, the exhaust gas from each engine passes through its associated exhaust pipe 44 and into an exhaust box 24 where the exhaust gas co-mingles with water being pumped into the exhaust box either directly or through the exhaust pipe 44. The water entering the exhaust box is used to cool the exhaust gas as well as the exhaust box. In a preferred embodiment, water is pumped into the box at the rate of about 20 gallons per minute.

The exhaust gas travels under the bottom of the hull 10 as the gas emerges through the exhaust outlets of the diffuser. The exhaust outlets are positioned just aft of the step 150 defined in the hull. Exhausting of the gas through the outlet holes taken in conjunction with the step in the hull lead to enhanced speed of the vessel. Further, the boat is silent because the exhaust is muffled by surrounding water. Fuel consumption is reduced and the boat handles better because of the buoyant effect that the exhaust gas bubbles have in raising the stern. In this way, the boat runs very level and, in high seas, the foaming effect of the exhaust gases lifts the stern and reduces the skin friction of the water.

As can be seen, the design of the exhaust box diffuser in conjunction with the stepped hull construction is extremely simple. The design does not require any unusual jigs, fixtures, forgings, etc. The stepped bottom is made while still preserving the general structural integrity of the hull.

While a preferred embodiment of the invention has been described, it is to be understood that changes and variations may be made without departing from the spirit and scope of the claimed invention. It is contemplated that in boats of differing size fewer or a greater number of engines than the four used in the specific embodiment disclosed may be employed. For example, in a fishing vessel having a length of about 60 feet, two engines, one on the starboard side of the hull and the other on the port side, would be employed with each engine being connected to a dedicated exhaust box.

I claim:

1. An underwater exhaust system for use with the bottom of the hull of a boat oriented in its position of intended use and having an engine giving off exhaust gas, the bottom of the hull extending from the bow to the stern of the boat and being defined between port and starboard chines and being divided by a longitudinally extending centerline, said system comprising:

an exhaust box mounted in the interior of said hull, said exhaust box defining a hollow interior and having a top opening and bottom opening;

first pipe means for conveying the exhaust gas from said engine into the top opening of said exhaust box;

a step extending from the port chine to the centerline and then to the starboard chine transversely across the entire bottom of the port and the starboard portions of said hull, said step defining within said hull on each of said port and starboard portions a generally planar recessed bottom aft of said step, said recessed bottom occupying a plane spaced from and being positioned inward relative to an imaginary generally planar surface defined by the aftward extension of the portion of said hull positioned forward of said step; and diffuser mean connected to said exhaust box and being positioned along the portion of said recessed bottom aft of said transverse step, said diffuser means for controlling the passage of the exhaust gas from said exhaust box along the exterior of said planar recessed bottom portion in an aftward direction.

2. The exhaust system of claim 1, further comprising cooling means for conveying sea water into said exhaust box for simultaneously cooling said exhaust box and the gas passing therethrough.

3. The underwater exhaust system of claim 2, wherein said cooling means comprises an opening defined in the bottom of said hull for receiving water from the sea, and second pipe means for conveying water from said opening directly into the interior of said exhaust box.

4. The exhaust system of claim 3, wherein said cooling means further comprises a pump in said second pipe means for moving said water into said exhaust box.

5. The exhaust system of claim 2, wherein said cooling means is connected to said first pipe means for first conveying water into said first pipe means and then into said exhaust box.

6. The exhaust system of claim 2, wherein said cooling means is directly connected to said exhaust box for conveying water directly into said exhaust box.

7. The exhaust system of claim 1, wherein said transverse step is positioned forward of the stern of said boat by a distance approximately equal to twenty-five percent of the overall length of the boat.

8. The exhaust system of claim 1, wherein said transverse step is positioned forward of the stern of said boat by a distance approximately equal to 20 to 30 percent of the overall length of the boat.

9. The exhaust system of claim 1, wherein said hull is of V-bottom construction and said step extends transversely from the starboard chine of said hull to the keel and then to the port chine.

10. The exhaust system of claim 1, further comprising a splash plate mounted in the interior of said exhaust system adjacent to said diffuser means.

11. The underwater exhaust system of claim 1, wherein said exhaust box comprises:

a pair of vertically oriented plates, said plates being spaced from each other to define a portion of the hollow interior of said exhaust box;

a bottom plate for securing said pair of plates to the hull of said boat;

a top plate for securing the tops of said pair of plates, said top and bottom plates defining a portion of the hollow interior of said exhaust box;

side plates secured to each of said pair of plates for completely defining the hollow interior of said exhaust box;

an opening defined in said top plate for receiving exhaust gas from said engine; and diffuser means defined in said bottom plates of said exhaust for controlling the passage of the exhaust gas from the interior of said exhaust box to the exterior bottom portion of said hull.

12. An underwater exhaust system for use with the bottom of the hull of a boat having an engine giving off exhaust gas, the hull being divided into port and starboard portions by a longitudinal centerline, the port and starboard portions terminating at port and starboard chines, respectively, said system comprising:

first and second exhaust boxes mounted in the interior of said hull, each of said exhaust boxes defining a hollow interior and having a top opening and a bottom opening;

first pipe means for conveying the exhaust gas from said engine into the top opening of each of said exhaust boxes;

a first step defined transversely along the entire bottom of said hull between said centerline and said port chine, said hull defining a first generally planar recessed bottom aft of said first step, said first recessed bottom occupying a first plane different from and being spaced inward relative to a first imaginary generally planar surface defined by the aftward extension of the portion of said hull positioned forward of said first step;

a second step defined transversely along the entire bottom of said hull between said centerline and said starboard chine, said hull defining a second generally planar recessed bottom aft of said step, said second recessed bottom occupying a second plane different from and being spaced inward relative to a second imaginary generally planar surface defined by the aftward extension of the portion of said hull positioned forward of said first step; and diffuser means covering the bottom opening of each of said exhaust boxes and being positioned along the bottom portion of said hull aft of each of said transverse steps, said diffuser means for controlling the passage of the exhaust gas from the interior of said exhaust boxes to the exterior bottom aft portions of said hull.

13. The exhaust system of claim 12, further comprising cooling means for conveying sea water into each of said exhaust boxes for simultaneously cooling said exhaust boxes and the gas passing therethrough.

14. The exhaust system of claim 13, wherein said cooling means comprises an opening defined in the bottom of said hull for receiving water from the sea, and second pipe means for conveying water from said opening directly into the interior of said exhaust boxes.

15. The exhaust system of claim 13, wherein said cooling means is connected to said first pipe means for first conveying water into said first pipe means and then into said exhaust boxes.

16. The exhaust system of claim 13, wherein said cooling means is connected to said exhaust boxes for conveying water directly into said exhaust boxes.

17. The exhaust system of claim 12, wherein said first and second transverse steps are each positioned the same distance forward of the stern of said boat by a distance approximately equal to 25% of the overall length of the boat.

18. The exhaust system of claim 12, wherein said first and second transverse steps are each positioned the same distance forward of the stern of said boat by a distance approximately equal to 20% to 30% of the overall length of the boat.

* * * * *